(12) United States Patent
Ammann et al.

(10) Patent No.: US 10,527,328 B2
(45) Date of Patent: Jan. 7, 2020

(54) COILED ADSORPTION HEAT EXCHANGER

(71) Applicant: International Business Machines Corporation, Armonk, NY (US)

(72) Inventors: Jens O. Ammann, Zurich (CH); Patrick Ruch, Jenins (CH)

(73) Assignee: International Business Machines Corporation, Armonk, NY (US)

(*) Notice: Subject to any disclaimer, the term of this patent is extended or adjusted under 35 U.S.C. 154(b) by 96 days.

(21) Appl. No.: 15/818,292

(22) Filed: Nov. 20, 2017

(65) Prior Publication Data

US 2018/0292115 A1    Oct. 11, 2018

Related U.S. Application Data

(63) Continuation of application No. 15/479,736, filed on Apr. 5, 2017.

(51) Int. Cl.
| | |
|---|---|
| F25B 17/08 | (2006.01) |
| F25B 35/04 | (2006.01) |
| F28F 1/30 | (2006.01) |
| B32B 1/00 | (2006.01) |
| B21D 53/04 | (2006.01) |

(Continued)

(52) U.S. Cl.
CPC ............. *F25B 35/04* (2013.01); *B21D 53/04* (2013.01); *B23P 15/26* (2013.01); *B32B 1/00* (2013.01); *F28F 1/30* (2013.01); *F28D 20/003* (2013.01); *F28F 13/003* (2013.01);
(Continued)

(58) Field of Classification Search
CPC combination set(s) only.
See application file for complete search history.

(56) References Cited

U.S. PATENT DOCUMENTS

| | | | |
|---|---|---|---|
| 6,227,383 B1 * | 5/2001 | De Ruiter | B01D 39/00 210/502.1 |
| 8,707,729 B2 | 4/2014 | Schmidt et al. | |

(Continued)

FOREIGN PATENT DOCUMENTS

| | | |
|---|---|---|
| DE | 19730698 A1 | 1/1999 |
| JP | 2007268439 A | 10/2007 |

(Continued)

OTHER PUBLICATIONS

Wang et al., "Experiment on a Continuous Heat Regenerative Adsorption Refrigerator Using Spiral Plate Heat Exchanger as Adsorbers", Applied Thermal Engineering, vol. 18, Nos. 1-2, Jan.-Feb. 1998, pp. 13-23.

(Continued)

*Primary Examiner* — Jun S Yoo
(74) *Attorney, Agent, or Firm* — Scully, Scott, Murphy & Presser, P.C.; Daniel Morris, Esq.

(57) ABSTRACT

A method for manufacturing a heat exchange unit for exchanging heat between a working fluid and a heat transfer fluid by means of adsorption. The heat exchange unit comprises a tube hosting the heat transfer fluid and being surrounded by mass channel coils comprising a metallic spacer strip in physical contact with the tube for permitting heat conduction and a metal foil strip supported by the spacer strip, a width of the foil strip exceeding a width of the spacer strip in an axial direction of the tube. Additionally, a heat exchange system comprising a plurality of the heat exchange units is provided.

9 Claims, 5 Drawing Sheets

(51) Int. Cl.
*B23P 15/26* (2006.01)
*F28F 13/00* (2006.01)
*F28D 20/00* (2006.01)

(52) U.S. Cl.
CPC ....... *F28F 2240/00* (2013.01); *F28F 2245/00* (2013.01); *Y02A 30/278* (2018.01); *Y02B 30/64* (2013.01)

(56) References Cited

U.S. PATENT DOCUMENTS

| | | | | |
|---|---|---|---|---|
| 2014/0352345 | A1* | 12/2014 | Hakbijl | B21D 53/04 62/314 |
| 2016/0334145 | A1 | 11/2016 | Pahwa et al. | |
| 2018/0363955 | A1* | 12/2018 | Alden | F25B 17/083 |
| 2019/0056064 | A1* | 2/2019 | Swanger | F17C 11/00 |

FOREIGN PATENT DOCUMENTS

| | | | |
|---|---|---|---|
| WO | WO 2007/017273 | A2 | 2/2007 |
| WO | WO 2015/104719 | A3 | 7/2015 |

OTHER PUBLICATIONS

Wang et al., "Performance researches and improvements on heat regenerative adsorption refrigerator and heat pump", Energy Conversion and Management, vol. 42, Issue 2, Jan. 2001, pp. 233-249.
Lambert et al., "Plate Heat Exchanger Adsorber for a Regenerative Adsorption Heat Pump", ASME 2004 International Mechanical Engineering Congress and Exposition, Advanced Energy Systems, Anaheim, CA, Nov. 20, 2004, pp. 1-20.
Dawoud et al., "Experimental investigation of the effect of zeolite coating thickness on the performance of a novel zeolite-water adsorption heat pump module", Proceedings of the 10th International Conference Enhanced Building Operations (ICEBO), Kuwait, Oct. 2010, pp. 1-8.
Füldner, "Performance evaluation and optimization of adsorption modules", presented at Sorption Friends Meeting 2015, Milazzo, Sicily, Sep. 2015, pp. 1-16.
List of IBM Patents or Patent Applications Treated as Related.

* cited by examiner

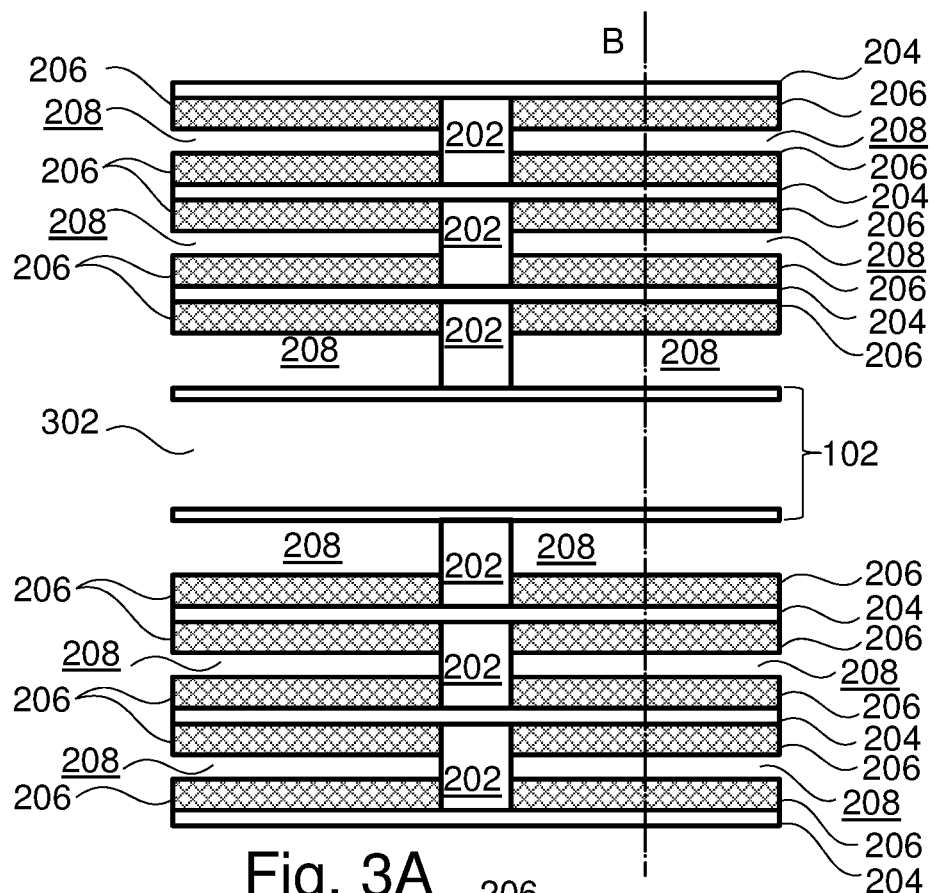
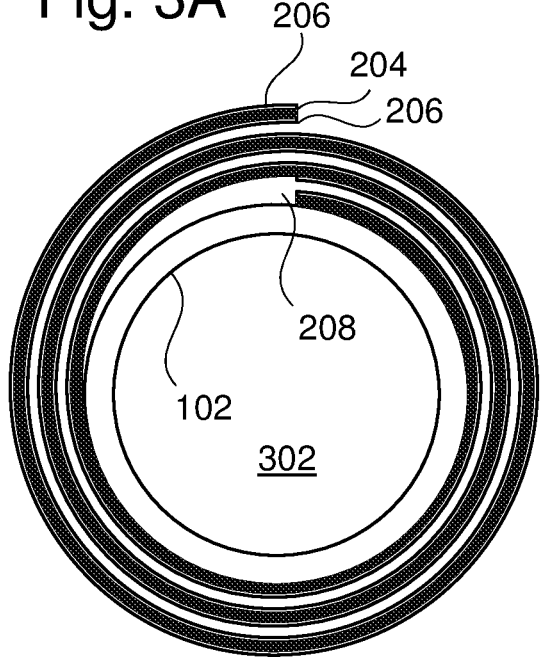
Fig. 3A
Fig. 3B

COILED ADSORPTION HEAT EXCHANGER

BACKGROUND

The present invention relates to adsorption heat exchangers.

Heat exchangers for exchanging heat between gaseous and liquid media are used in a wide range of large-scale and high-value industrial applications, including: air drying and dehydration in open and closed systems, water removal from volatile organic compounds (VOCs) or natural gas, solvent recovery, gas separation (e.g. nitrogen from air), water separation from ethanol (in biofuel production), or $CO_2$ and $N_2$ separation from natural gas. Among further heating and cooling applications are adsorption-based heat pumps with an adsorption heat exchanger as the central part, which may, for instance, be used for energy efficient data centers with internal heat recovery.

An efficient technology for providing the physical contact which is necessary for exchanging heat with the gaseous medium is adsorption, the attachment of atoms or molecules from the gaseous phase on external surfaces of the heat exchanger. These surfaces are made from materials with a high heat conductivity to provide a good thermal coupling between the two fluids interacting in the heat exchanger.

The challenge of designing an effective adsorption-based heat exchanger is to find the best compromise between maximizing its thermal coupling performance by offering a large surface for adsorbing the gas while keeping low resistances for both the mass transport and the heat transport and ensuring a maximum of mechanical robustness. Key figures for characterizing an adsorption heat exchanger are the cooling power per unit volume, or volumetric sorption power (VSP), i.e. the amount of heat transferred in an evaporator per liter of internal volume of the adsorption-based heat exchanger, and the volumetric efficiency, which is the percentage of the internal volume which is not used by heat transport channels or mass transport channels.

Known from the state of the art are fixed-bed adsorbers, in which an adhesive may be used to attach individual adsorbent beads to each other and to the surface of a heat exchanger. However, there is an inherent trade-off between improving mass transfer (smaller particles) and improving thermal transport (reduce number of interfaces) which limits the sorption rate.

A more effective technology uses adsorbent coatings on lamellae to improve the thermal contact between adsorbent and heat exchanger by enlarging the contact area. The coating is either formulated using a binder or direct synthesis of the adsorbent on the heat exchanger. However, mass transport within the coating is poor, which limits the maximum coating thickness, leading to a poor volume utilization. A VSP of 140 watts per liter (W/L) was reported for this technology in "Experimental investigation of the effect of zeolite coating thickness on the performance of a novel zeolite-water adsorption heat pump module", Proceedings of the 10th International Conference Enhanced Building Operations (ICEBO), Kuwait, October 2010, by B. Dawoud et al.

Yet higher adsorption efficiencies have been achieved by the use of adsorbent coatings on metal fibers, a technology still under development. Coated fibers feature improved thermal transport by applying the adsorbent coating on a network of metallic fibers while the vapor transport is improved by the empty percolating channel space between the fibers. A VSP between 200 and 500 W/L was reported for this technology in "Performance evaluation and optimization of adsorption modules", presented at Sorption Friends Meeting, Milazzo, Sicily, September 2015, by G. Füldner.

SUMMARY

In one aspect, the invention relates to a heat exchange unit for exchanging heat between a working fluid and a heat transfer fluid by adsorption and desorption of the working fluid, wherein the heat exchange unit comprises:
   a tube to carry the heat transfer fluid along its inner surface, and
   at least one mass channel coil wound around the tube in an orthogonal direction with respect to a central axis of the tube, wherein each of the at least one mass channel coil comprises:
      a coiled metallic spacer strip being in physical contact with the tube for permitting heat conduction, and
      a coiled metal foil strip being supported by the spacer strip, a width of the foil strip exceeding a width of the spacer strip in an axial direction of the tube.

In another aspect, the invention relates to a heat exchange system comprising a hermetically sealed chamber to contain a low pressure working fluid below atmospheric pressure or a high pressure working fluid above atmospheric pressure, and a plurality of the heat exchange units disposed within the vacuum chamber, the tubes of the heat exchange units being aligned in parallel and being in hydraulic communication with each other. A heat exchange system equipped with the heat exchange units according to the first aspect of the invention may reach unprecedented values of volumetric sorption power. It is expected that such heat exchange system may exceed the value of 500 W/L which is known from the state of the art.

In another aspect, the invention relates to a method of manufacturing an adsorption heat exchange unit, wherein the method comprises:
   depositing an adsorbent coating on a metal foil strip, omitting a surface area of the foil strip which connects to a metallic spacer strip, simultaneously coiling the spacer strip and the coated metal foil strip onto a tube, the coiling direction being orthogonal with respect to a central axis of the tube, the spacer strip supporting the metal foil strip,
   mechanically compressing or welding the spacer strip and the metal foil strip using the omitted surface area.

The described heat exchange unit may offer a higher volumetric efficiency due to its three-dimensional structure formed by the tube, the spacer strip and the foil strip, as compared to the two-dimensional mass channel structure formed by conventional lamellae. The increased surface which is available for adsorption may result in a higher volumetric sorption power.

Compared to heat exchangers based on metallic fibers, the heat exchange unit may provide a directed flow of the adsorbate on all scales of the internal adsorption surfaces. This may result in a lower mass transport resistance. In further distinction to heat exchangers based on metallic fibers, the same heat exchange unit may provide a directed flow of heat in the direction perpendicular to the tube axis by means of the stacked configuration of the coiled spacer strip. In addition, the at least one mass channel coil may be manufactured on a comparably low complexity level, using proven tape coiling and processing machinery.

According to an embodiment, a thickness of the spacer strip in a radial direction of the tube is selected such that first mass channels are formed between opposing layers of the foil. The mass channels thus formed in a parallel orientation to the tube may form an additional regime or order of mass channels compared to the mass channels formed by conventional lamellae oriented orthogonally with respect to the tube. This may increase the available adsorption surface and the volumetric efficiency of the heat exchange unit.

According to an embodiment, the foil strip comprises an adsorbent coating for performing the adsorption and desorption of the working fluid. An adsorbent coating may have the beneficial effect that the heat exchange unit may reach an increased adsorption/desorption performance than would be possible if the foil strip was manufactured from natively adsorbent materials. This may increase the volumetric sorption power even further.

According to an embodiment, the heat exchange unit comprises at least two of the mass channel coils, wherein each of the coils are separated by second mass channels having a width between 1 and 10 millimeters in an axial direction of the tube. Using more than one coil may have the advantage that the foil strips do not have to be dimensioned as wide as would be necessary with a single mass channel coil, thus offering a better mechanical stability and lower mass transport resistance. The dimensioning of the second mass channels is governed by the same principles which apply for the first mass channels: too narrow mass channels may result in a higher mass transport resistance, while too wide mass channels may deteriorate the adsorption performance due to low mass flow into the first channels.

According to an embodiment, the first mass channels are formed by parallel, equidistant, straight grooves extending across the coating in an axial direction of the tube, wherein the thickness of the spacer strip is selected such that opposing layers of the foil strip are physically contacting each other. If the spacer strip is scaled such that adjacent adsorbent coatings of the foil strip come into physical contact with each other, first mass channels can still be formed by engraving the adsorbent coating with straight gaps prior to coiling. This way, the coil may reach a high winding density, resulting in high adsorption performance due to a large volumetric efficiency.

The described manufacturing method is based on forming a mass channel coil from the spacer strip and the foil strip on the tube. This may have the advantage that the number of mass channels per unit volume can be higher than in conventional adsorption heat exchangers, as the channel walls are formed by the smooth surfaces of a thin, but stiff foil strip. By dimensioning the spacer strip accordingly, it may be possible to scale down the radial distance of subsequent windings substantially below 1 mm. For example, the prototype of a mass channel coil was manufactured by the inventors with an average coil winding distance of 0.375 mm, which is roughly five times closer than 1.9 mm measured with a conventional adsorption heat exchanger based on coated lamellae.

Furthermore, the coiled mass channel design may offer a lower mass transport resistance than conventionally, as metal foils can be manufactured with a very high surface smoothness and no larger mechanical stress must be applied during the coiling process, as it is usually the case for lamellae-based heat exchangers, where the lamellae are pressed onto the tube with a high force, resulting in vertical bends and bulges close to the tube.

Mechanically compressing or welding the spacer strip and the metal foil strip may beneficially increase the mechanical stability of the coil, which would otherwise be very sensitive to shear forces acting on the foil strip.

BRIEF DESCRIPTION OF THE SEVERAL VIEWS OF THE DRAWINGS

In the following, embodiments of the invention are explained in greater detail, by way of example only, making reference to the drawings in which:

FIG. 3A shows a detail of FIG. 1, illustrating the thermal connection of the foil strip and the spacer strip to the tube, FIG. 3B shows a radial cut through the coil portion shown in FIG. 3A, FIG. 4A schematically illustrates an exemplary manufacturing process of a heat exchange unit.

DETAILED DESCRIPTION

Figure 1:
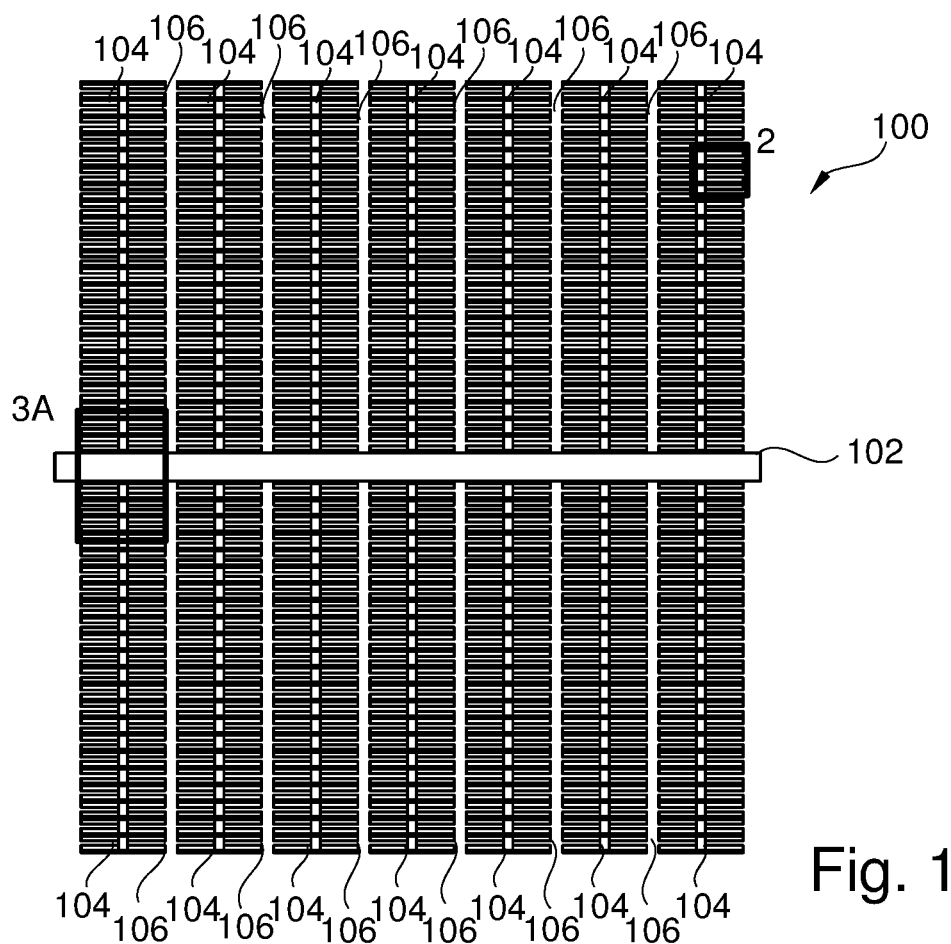
FIG. 1 shows a cut through an exemplary heat exchange unit with a plurality of mass channel coils.

The descriptions of the various embodiments of the present invention are being presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

According to an embodiment, the spacer strip is supported by the respective underlying winding of the metal foil strip. This may allow for manufacturing the at least one mass channel coil with more than one winding to increase the available adsorption surface per unit length of the tube.

According to an embodiment, a thickness of the first mass channels in a radial direction of the tube being between 50 and 300 micrometers. According to another embodiment, a length of the first mass channels in an axial direction of the tube being between 0.5 and 10 millimeters. According to yet another embodiment, the width of the foil strip is between 2 and 10 times the width of the spacer strip.

Said embodiments may allow for a flexible selection of the mass channel dimensions in an efficient range for balancing the need for a large adsorption surface and a low mass flow resistance. The foil strip, and the first mass channels accordingly, should not be too wide in order to avoid sticking of opposing layers and to maintain a low mass transport resistance. The thickness of the first mass channels may be scaled in a similar manner to provide a large adsorption area without hampering the mass flow of the adsorbate too strongly. Especially the relative scale of the width of the foil strip and the width of the spacer strip may yield a reasonable balancing of the opposing requirements. The absolute dimensions of the first mass channels may be used to customize the heat exchange unit to system parameters like working temperature or mass flow which are envisaged for a particular usage scenario.

According to an embodiment, the foil strip is centrally aligned with the spacer strip. A central alignment may yield an improved mechanical stability of the foil strip and support faster adsorption/desorption cycles than would be possible with an asymmetric alignment because all first mass channels may be filled or, respectively, emptied on the same timescale.

According to an embodiment, the coating comprises a coating material selected from one of a zeolite, a metal-organic framework, or silica. These materials and material classes may be beneficial due to their large surfaces on microscopic scales and their known effectiveness in adsorption applications. Such coating materials may offer a high adsorption performance without affecting the volumetric efficiency of the heat exchange unit.

According to an embodiment, the coating has a maximum thickness of 200 micrometers on each side of the foil strip. A maximum thickness of the coating may have the advantage that the coating materials, which are usually comparably expensive materials, are applied more efficiently. Furthermore, materials with a good adsorption performance are often also good thermal insulators. Therefore the coating should not be applied too thickly in order to keep a low thermal resistance.

According to an embodiment, a thickness of the foil strip in a radial direction of the tube is between 4 and 500 micrometers. Said dimensioning of the foil strip thickness may provide an optimal range for defining the heat transport properties of the coil structure. Selecting the foil strip thickness too thin may increase the thermal resistance of the structure as a consequence of low heat capacity of the foil strip. A thin foil strip may also suffer from poor mechanical stability, increasing the risk of obstruction due to touching opposing windings of the coil. On the other hand, too thick a foil strip may not yield any further gain in heat conductivity and decrease the efficiency of the heat exchange unit by wasting material and space.

According to an embodiment, each of the foil strip and the spacer strip is formed from aluminum or copper. These materials may provide a high heat conductivity and mechanical stability at the same time. While copper belongs to the materials with the highest known specific heat conductivity, using aluminum may be more cost-effective as it is less expensive, however providing only about half the specific heat conductivity of copper.

According to an embodiment, the at least one mass channel coil extends between 1 and 10 centimeters in a radial direction of the tube. This may provide an optimum range for selecting the height of the mass channel coil: if the mass channel coils comprise a too small number of windings, they might offer too little adsorption surface per unit length of the tube, necessitating the use of a larger amount of heat exchange units in order to reach a comparable volumetric efficiency, while the mass channel coil may become ineffective due to too long heat transport paths and poor mechanical stability if the number of windings around the tube is too high. As the radial extension or height of the coil relates to the widths of the first mass channels and the spacer strip, a coil formed from appropriately dimensioned metal strips may provide sufficient stability and performance if its total height is within said range.

According to an embodiment, the tubes have a length of 10 to 100 centimeters. A reasonable dimensioning of the tubes may provide the advantage that the capacity of the heat exchange system can be customized to the working parameters of the system where it is to be employed. Too long tubes may render the heat exchange system inefficient as more adsorption surface is offered than actually needed for a typical adsorption/desorption cycle, while the system may become ineffective if the tubes are too short, with the consequence that part of the adsorbate may pass the heat exchange system without undergoing adsorption and exchanging heat with the working fluid.

According to an embodiment, the heat exchange units are arranged as a hexagonal lattice. Such arrangement may beneficially offer a higher volumetric efficiency than would be possible, e.g. with a square lattice arrangement.

According to an embodiment, the method further comprises forming parallel, equidistant, straight grooves on the coating, the grooves extending in an axial direction of the tube. The grooves formed on the coating may be used as mass channels in the mass channel coil design where the windings are packed so closely that subsequent layers of the coated foil strip come into physical contact with each other. This may yield a heat exchange unit with increased volumetric sorption power due to a high volumetric efficiency and an advantageous ratio of mass channel volume and adsorption surface.

The design of an adsorption heat exchanger must balance the requirements of maximizing the thermal coupling between the two interacting fluids while providing a low thermal resistance for the heat transport between the adsorbate and the heat transfer fluid, a low mass transport resistance for the adsorbate in order to use the available adsorption surfaces efficiently, and mechanical stability of the structure during manufacturing, installation and use of the heat exchange unit. Usually the mechanical stability, i.e. the requirement of providing a robust thermal and mechanical connection between the adsorption surfaces and the tubes containing the heat transfer fluid as well as stiffness of the adsorption surface material to prevent deformations and clogging of the adsorbent structure, is the limiting factor which prevents a more efficient occupation of the volume available in a heat exchanger with adsorption surfaces available for the adsorbate, or in other words, a heater exchanger design with a higher volumetric efficiency, and accordingly, a higher volumetric sorption power. As a result, large heat exchanger areas are required to achieve a certain output performance, resulting in bulky devices and high investment cost. Therefore, new adsorption heat exchanger structures with improved performance per unit heat exchanger area are needed to reduce active area requirements and capital cost.

An exemplary heat exchange unit 100 according to the invention is shown in FIG. 1. It comprises a tube 102 for carrying a heat transfer fluid 302, and a plurality of mass channel coils 104 which are wound around the tube 102 in an orthogonal orientation with respect to the tube's central axis. Gaps are provided between the single mass channel coils 104 of this parallel arrangement, thus forming second mass channels 106 which are adapted for guiding a gaseous adsorbate towards the tube 102 and into the smaller mass channels of the mass channel coils 104. In the desorption case, the adsorbate leaving the mass channel coils 104 is guided outward through the circular second mass channels 106.

Figure 2:
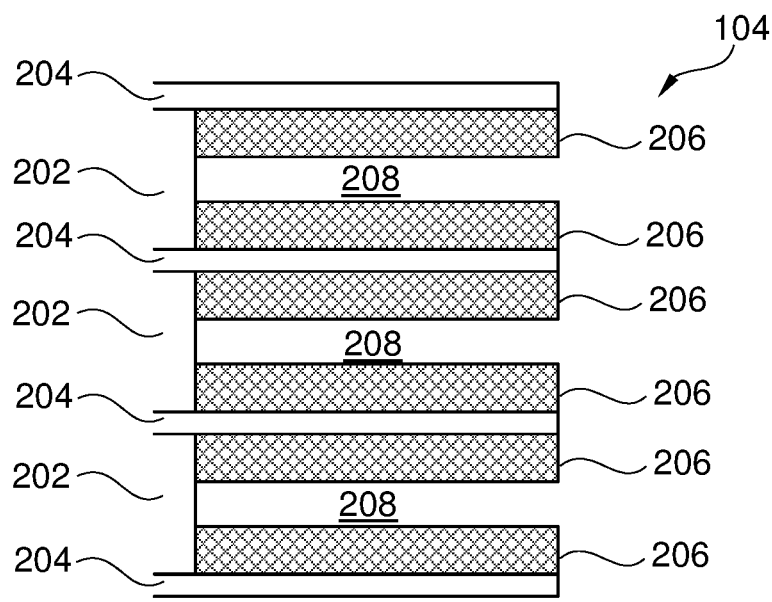
FIG. 2 is a detail of FIG. 1, showing first mass channels formed between subsequent layers of the foil strip.

The composition of the mass channel coils 104 as well as the first mass channels 208 formed between the windings of the mass channel coils 104 can be seen in greater detail in FIG. 2. A spacer strip 202 is wound around the tube 102 together with a foil strip 204, the spacer strip 202 and the foil strip 204 thus supporting each other in the subsequent windings of the coil 104. The spacer strip 202 and the foil strip 204 are made from metallic materials with a high specific heat conductivity, preferably aluminum or copper. The thickness, measured in a radial direction of the coil 104, and the width, measured in an axial direction of the tube 102, of the foil strip 204 are chosen such that the foil strip 204 is just stiff enough to bear mechanical stress at levels which are typically occurring during handling and operation of the heat exchange unit 100 without irreversible deformation.

The thickness of the foil strip 204 is preferably selected as thin as possible in order to maximize the number of windings per unit length of the coil radius, but just thick enough to provide sufficient heat conductivity between the spacer strip 202 and the adsorbate. The spacer strip 202 has a rectangular cross-section and is in physical contact with the adjacent layers of the foil strip 204. It is adapted for transporting heat between the heat transfer fluid 302 inside the tube 102 and the adsorption surfaces provided by the foil strip 204.

The thickness of the spacer strip 202 determines the thickness of the gaps formed by subsequent windings of the foil strip 204, and accordingly, the height of the first mass channels 208 thus formed. A smaller spacer strip thickness will yield a higher winding number, but will increase mass transport resistance for the adsorbate due to increased interaction between mass channel walls and adsorbate and possibly also a turbulent gas flow in the first mass channels 208 if it is selected too small. On the other hand, selecting too large a thickness for the spacer strip 202 is also not advisable because space is wasted which could be used for providing a larger total adsorption surface by increasing the number of windings.

The width of the spacer strip 202 is preferably chosen as small as possible to maximize the length of the first mass channels 208, but selecting it too small will result in poor shear stability of the coil 104. Optionally, the spacer strip 202 may feature a slight axial tapering, to enable increased coil stability and heat capacity near the tube 102.

The foil strip surfaces forming the walls of the first mass channels 208 are covered with a layer of an adsorbent coating material 206. Materials which have good adsorption performance are usually porous materials with a large microscopic surface, allowing for an effective docking of adsorbate particles. Adsorbent materials may comprise ionic crystals carrying local electric charges, or neutral materials such as neutral zeolites. Good adsorbent materials are often ceramics or comparable artificial materials. Preferably, the adsorbent material is one of the following: a metal aluminophosphate such as SAPO, AlPO or FAPO; a metal-organic framework (MOF) such as aluminum fumarate or copper-1,3,5-benzenetricarboxylate; a zeolite such as 3A, 4A or 13X.

The adsorbent coating 206 can be deposited on the foil strip surfaces with any coating process which is suitable for metallic tapes, for example dip coating or slurry coating, but also more sophisticated methods such as epitaxial growth may be applied. The adhesion, which is normally poor between metals and ceramic coatings, can be increased by depositing a suitable compatibility layer on the metal surfaces before applying the adsorbent coating 206. Alternatively, a binder suitable for the specific combination of metal and adsorbent material may be added to the coating material 206.

Preferably, the thickness of the adsorbent coating 206 is chosen as thin as possible to just offer a sufficiently large adsorption capacity, but not hamper the thermal transport between adsorbate and foil strip 204 due to the fact that materials with a good adsorption performance are usually also strong thermal insulators. Thin coatings 206 may also be more resistant against wear after repeated use.

According to calculations performed by the inventors, a heat exchange unit 100 which is equipped with coating layers 206 of 200 µm thickness might reach a volumetric sorption power of 120 watts per liter due to the increased volumetric efficiency achieved by the mass channel coil design of the heat exchange unit 100. This is about twice the volumetric sorption power typically reached by adsorption heat exchangers based on metal lamellae known from the state of the art. It is expected that the volumetric sorption power of a heat exchange unit 100 scales inversely with the coating thickness, i.e. a 20 µm coating 206 might yield a volumetric sorption power which exceeds that of conventional lamellae-based adsorption heat exchangers by a factor of 10. This may be possible because the invention supports maintaining a high volumetric efficiency even when very thin coatings 206 are used. The space gained by reducing the thickness of the adsorbent coating 206 may be used to increase the number of windings per unit radius by reducing the thickness of the spacer strips 202 accordingly. In other words, the mechanical stability of the coil structure 104 is independent from the dimensioning of the first mass channels 208, and hence there is no lacking volumetric efficiency to be compensated by providing thicker layers of adsorbent coating material 206. Instead, the coating thickness may be scaled down with or without the grain size of the adsorbent material 206 until a surface coverage limit is reached.

Preferably, the spacer strip 202 has a rectangular or square cross-section and is between 0.2-1.5 mm wide and 0.2-1.5 mm thick, while the foil strip 204 is between 5-30 mm wide and 0.02-0.15 mm thick. Within these ranges, smaller dimensions are most preferred (e.g. spacer strip 0.3 mm wide and 0.3 mm thick, foil strip 10 mm wide and 0.02 mm thick), but larger dimensions may be mechanically more robust and may be preferable in terms of manufacturability.

The two metal strips or sheets used to fabricate the coiled heat exchanger geometry should preferably have a high thermal conductivity and sufficient softness and elasticity to be wound in the coiled structure; particularly preferred are aluminum or its alloys, or copper, preferably oxygen-free. Any combination of aluminum or copper may be used in the invention.

FIG. 3A shows another detail from FIG. 1 where the physical contact of the metal strips forming the coil 104 and the tube 102 is illustrated. The spacer strip 202 is in physical contact with the outer surface of the tube 102 hosting the heat transfer fluid 302. Said connection ensures a good thermal transport between the adsorbent surfaces 206 and the tube 102. The inner wall of the innermost winding of the first mass channels 208 is formed by the outer surface of the tube 102. As can be seen in FIG. 3b, it is also possible to start the mass channel coil 104 with the foil strip 204 being the first layer which is in contact with the tube 102. In this case it may be advantageous to leave away the coating 206 on the side of the foil strip 204 which is facing the tube 102 above the length of the first winding to ensure a sufficiently strong physical contact with the tube 102. In the radial cut of FIG. 3b it becomes clear that each first mass channel 208 has a spiral structure which does not affect the mass transport resistance of the heat exchange unit 100 as the mass transport of the adsorbate is directed axially into and out of the first mass channels 208.

Figure 4A:
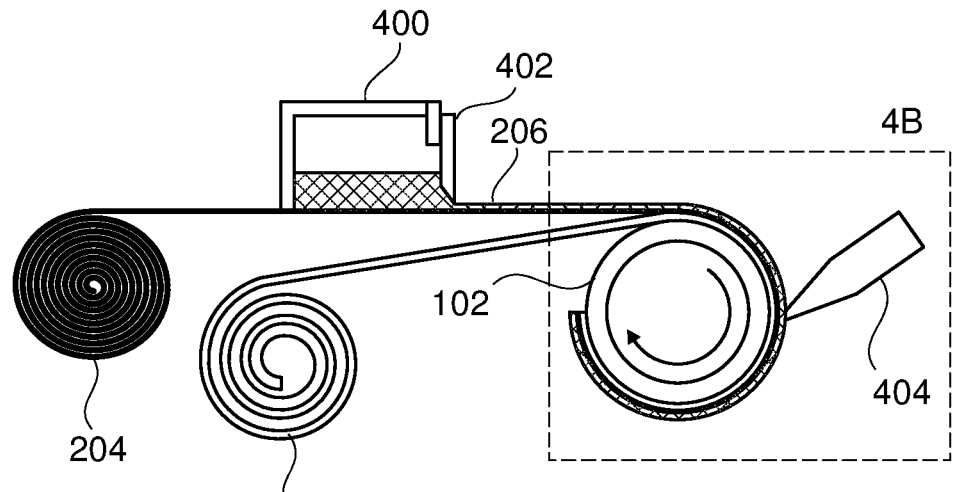
FIG. 4B is a 3D view of a detail of FIG. 4A illustrating the welding process, FIG. 4C provides an exploded view of a portion of two subsequent windings formed by the manufacturing process.

Now turning to FIG. 4, an exemplary manufacturing setup for a heat exchange unit 100 is shown in FIG. 4A. The spacer strip 202 and the foil strip 204 are simultaneously coiled onto the tube 102 in a roll-to-roll process. A tape casting setup comprising a slurry container 400 and a doctor blade 402 is used for depositing a slurry containing an adsorbent coating material 206 on the upper side of the foil strip 204 before it is coiled up on the tube 102. The schematic view of FIG. 4A is meant to illustrate the manufacturing principle only. In a real manufacturing process, a more complex setup may be used to deposit the adsorbent coating 206 on both sides of the foil strip 204. Other typical tape casting components such as a drying station may also be present in the setup. It is also understood that different deposition technologies such as dip coating or a physical or chemical vapor deposition technique may be used instead of tape casting. Preferably, a coating process is used where the coating 206 is applied before coiling.

Figure 4B:
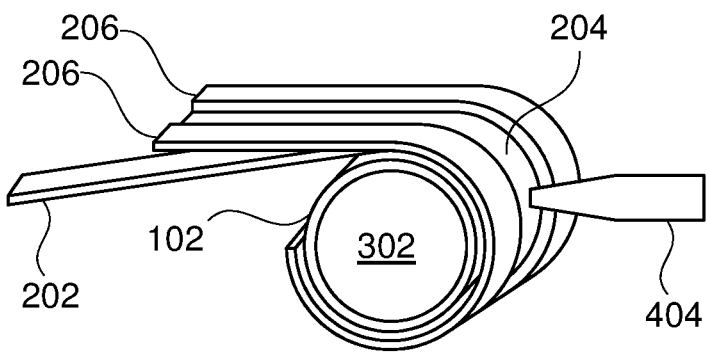
Figure 4C:
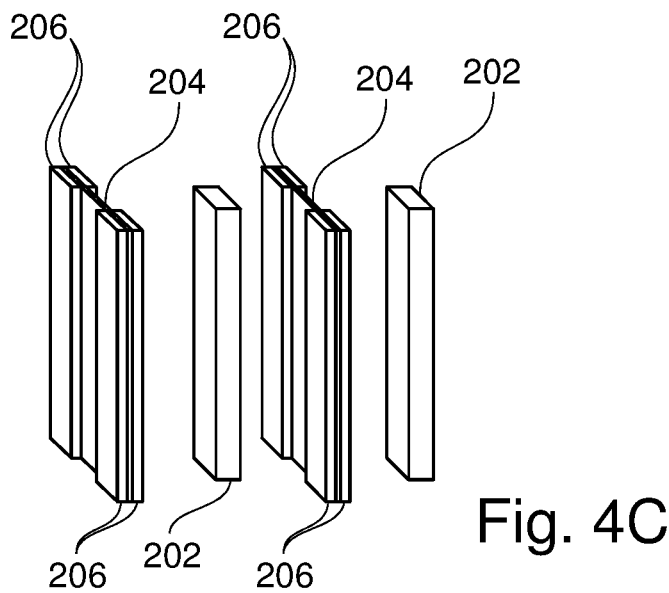

As can be seen in FIG. 4B, no adsorbent coating 206 is deposited in the center of the foil strip 204. In the shown case of tape casting, this can be achieved by structuring the slurry container 400 outlet accordingly. The gap thus formed in the coating layer 206 is left out because it may receive the spacer strip 202 of the next coil winding and the thermally insulating coating 206 would act as a thermal barrier between subsequent layers of the coil 104. The relative arrangement of subsequent layers of the spacer strip 202 and the foil strip 204 supporting each other is seen more clearly in the exploded detail view of FIG. 4C. For thin coatings, i.e. less than 100 μm, the coil may also be wound without previously forming said gap, for then the compressive force imposed upon the coating layer during coiling may be sufficiently strong to achieve an adequate thermal contact between the spacer strip 202 and the foil strip 204.

The gap is also used to provide a welding surface to fix the coiled strip structure to a mechanically robust mass channel coil 104. Preferable welding technologies pose no damage or significant deformation on the strip layers to be bonded together. Non-exhaustive examples include DT welding, ultrasonic welding and cold welding. The welding process is represented by a welding electrode 404 in FIGS. 4A and 4B. It is understood that more than one welding electrode 404 may be used to weld subsequent layers together more efficiently. For example, the two metal strips may be coiled up under one electrode 404 for welding the foil strip 204 onto the spacer strip 202 and another electrode 404 for welding the spacer strip 202 onto the foil strip 204 of the preceding winding of the coil 104.

The inventors have found that the compressive force realized during the coiling process may also be sufficient to obtain mechanically robust mass channel coils without further need for welding. In this case, a sufficiently high resistance must be applied against rotation of the precursor coils comprising the spacer strip 202 and the foil strip 204, respectively, in order to realize a high tension in the spacer strip 202 and the foil strip 204 during the coiling process. The resistance may easily be adjusted, e.g. by means of a regulating screw pressing against the respective axes of the precursor coils.

Figure 5:
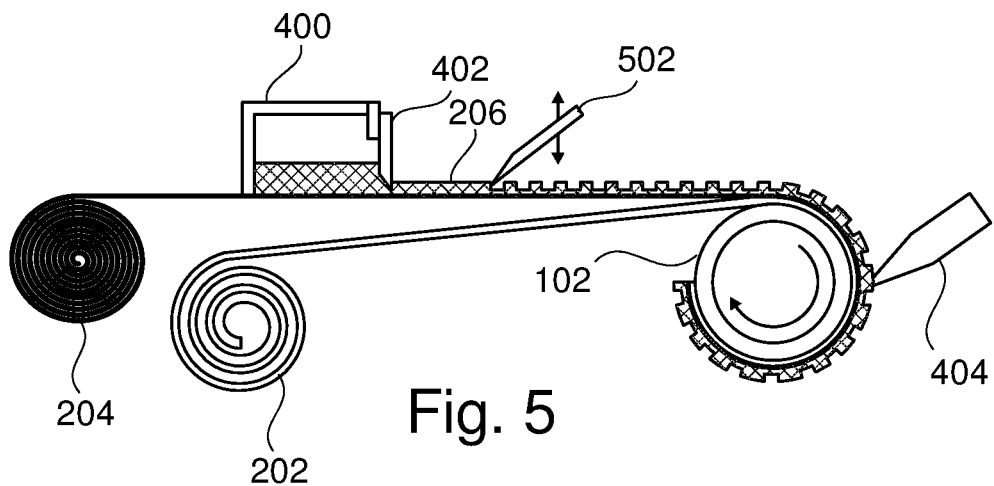
FIG. 5 shows an alternative manufacturing process for a heat exchange unit.

FIG. 5 shows another setup for manufacturing a heat exchange unit 100 according to the invention which is largely identical to the manufacturing setup shown in FIG. 4. The manufacturing process shown in FIG. 5 differs from the one in FIG. 4 only in the presence of a structuring tool 502 which is adapted for creating a surface structure in the adsorbent coating 206, and a thinner spacer strip 202 being used, the spacer strip 202 having nearly twice the thickness of the adsorbent coating layer 206.

Figure 6A:
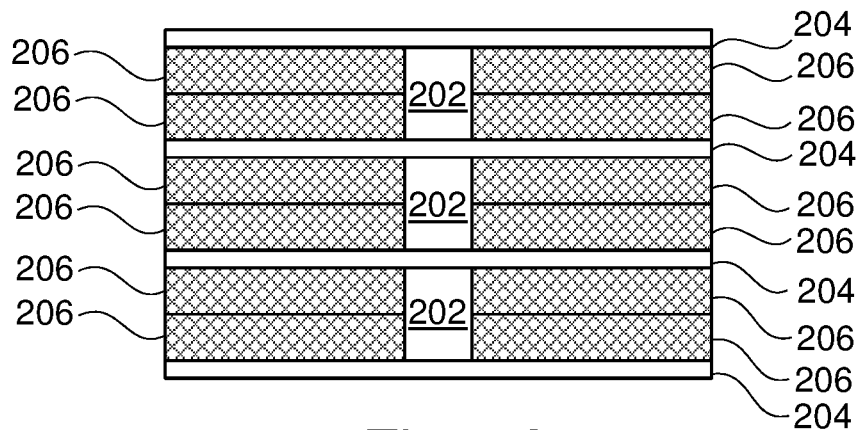
FIG. 6A depicts an axial cut through a portion of an exemplary product formed by the manufacturing process shown in FIG. 5.
Figure 6B:
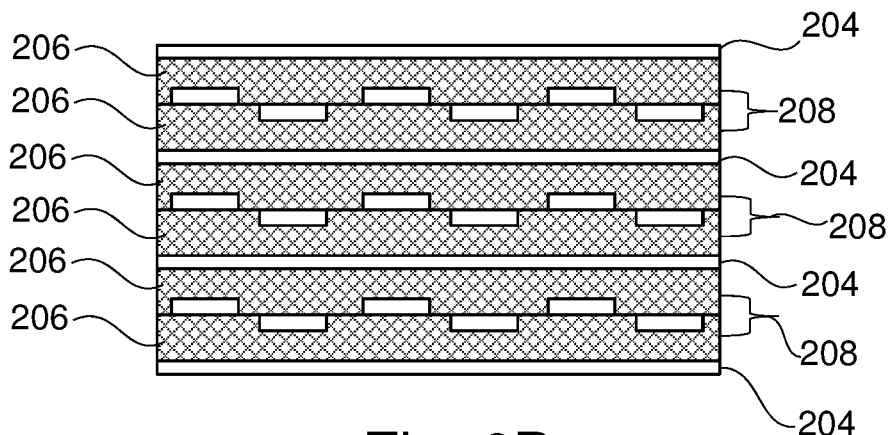
FIG. 6B depicts a radial cut through the exemplary product shown in FIG. 5.

A detail of an axial cut through a mass channel coil 104 produced with the manufacturing setup shown in FIG. 5 is shown in FIG. 6A. The reduced thickness of the spacer strip 202 is seen to have the effect that neighboring layers of the spacer strip 202 come into physical contact with each other such that, in this view, no first mass channels 208 are visible between the touching coating layers 206 anymore. Instead, the first mass channels 208 are now formed by parallel grooves which were introduced into the coating surface 206 by the surface structuring tool 502 shown in FIG. 5, as can be seen in the radial projection detail depicted in FIG. 6B. This illustrates that the invention may still be implemented with mass channel coils 104 whose winding number cannot be increased further because the subsequent windings are already contacting each other. A high precision surface structuring process can use the space which is normally occupied by the adsorbent coating 206 to provide both the first mass channels 208 and the adsorbent coating 206. In this way a very high volumetric efficiency may be reached in the microscopic region.

Figure 7:
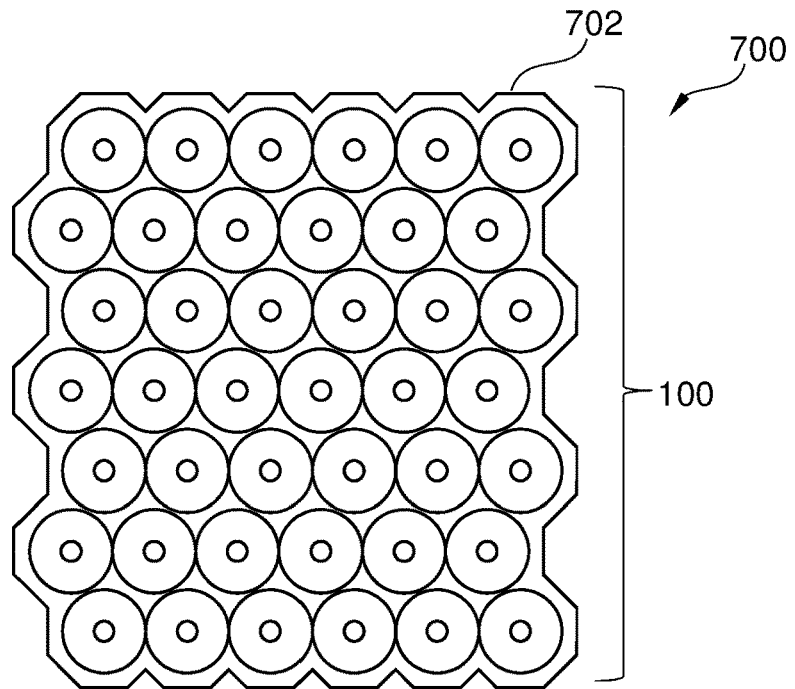
FIG. 7 shows a radial cut through an exemplary heat exchange system according to the invention.

A plurality of heat exchange units 100 according to the invention may be used to form a higher hierarchical step or regime of heat exchange functionality in a heat exchange system 700. The plurality of heat exchange units 100 is arranged in a hexagonal pattern where the tubes 102 are arranged in parallel and put into hydraulic communication with each other. On this level, the mass flow of the adsorbate is directed parallel to the tubes 102, whereas the heat flow is performed by the heat transfer fluid 302 inside the tubes 102. The plurality of heat exchange units 100 is contained in a vacuum chamber 702 closely surrounding the outermost heat exchange units of the arrangement such that the amount of dead volume not participating in the mass transport to and from the adsorption surfaces is minimized. The hierarchy level shown in FIG. 7 may also comprise interfaces to a higher-level system, such as a heat pump, in which the heat exchange system is embedded.

Figure 8:
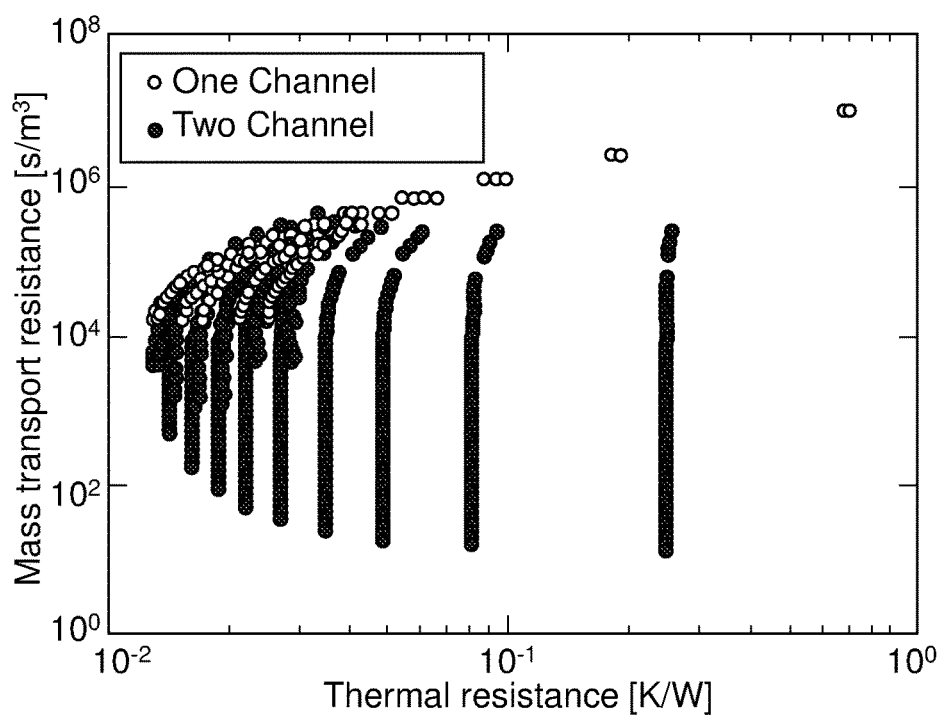
FIG. 8 is a diagram illustrating theoretical values for the mass transport resistance and the thermal resistance which may be achieved with heat exchange units according to the invention.

Advantageous effects that may be achieved with heat exchange units 100 are illustrated by the diagram shown in FIG. 8. The points shown within the 2D plot indicate value pairs of mass transport resistance in seconds per cubic meter ($s/m^3$) and thermal resistance in Kelvin per watt (K/W) which were calculated for a typically dimensioned conventional single channel adsorption heat exchanger and a two channel heat exchanger according to the invention. The calculation was repeated for a series of different channel geometries, which can be discerned as detached point groups in the diagram. It is seen that the values for conventional designs are mostly populating thermal resistances below 0.1 K/W, but none of them reaches a mass transport resistance below $10^4$ $s/m^3$. In contrast, the points representing two-channel heat exchange units 100 can reach mass transport resistances below $10^2$ $s/m^3$ even for numerous designs with thermal resistances well below 0.1 K/W. In addition, several transport channel designs reach mass transport resistances down to about 10 $s/m^3$ in mid-to-high thermal resistance ranges up to a few $10^{-1}$ K/W which are far from the regions populated by the points representing single channel designs. It is seen that the double channel designs according to the invention may reach unprecedented working parameters of low mass transport resistance and may offer a strongly increased flexibility for designing heat exchange units 100 and systems for a greater variety of applications.

100 heat exchange unit
102 tube
104 mass channel coil
106 second mass channel
202 spacer strip
204 foil strip
206 adsorbent coating
208 first mass channel
302 heat transfer fluid
400 slurry container
402 doctor blade
404 welding electrode
502 structuring tool
700 heat exchange system
702 vacuum chamber

The invention claimed is:

1. A method of manufacturing an adsorption heat exchange unit, the method comprising:
  depositing an adsorbent coating on a metal foil strip, omitting a surface area of the foil strip which connects to a metallic spacer strip,
  simultaneously coiling the spacer strip and the foil strip onto a tube to form a mass channel coil, the coiling direction being orthogonal with respect to a central axis of the tube, the spacer strip supporting the foil strip, and
  mechanically compressing or welding the spacer strip and the metal foil strip using the omitted surface area.

2. The method of claim 1, further comprising:
  forming parallel, equidistant, straight grooves on the coating, the grooves extending in an axial direction of the tube.

3. The method of claim 1, further comprising: supporting the spacer strip by the respective underlying winding of the metal foil strip.

4. The method of claim 1, further comprising:
  selecting a thickness of the spacer strip in a radial direction of the tube such that first mass channels are formed between opposing layers of the foil.

5. The method of claim 1, further comprising: aligning the foil strip centrally with the spacer strip.

6. The method of claim 1, wherein the foil strip comprises an adsorbent coating material for performing the adsorption and desorption of the working fluid.

7. The method of claim 6, wherein the coating material is selected from one of a zeolite, a metal-organic framework, or silica.

8. The method of claim 6, further comprising:
  forming first mass channels by parallel, equidistant, straight grooves extending across the coating in an axial direction of the tube, and
  selecting the thickness of the spacer strip such that opposing layers of the foil strip are physically contacting each other.

9. The heat exchange unit of claim 1, further comprising:
  forming at least two mass channel coils, each of the coils being separated by a second mass channel having a width between 1 and 10 millimeters in an axial direction of the tube.

* * * * *